3,441,518
Patented Apr. 29, 1969

3,441,518
DIFLUOROAMINO EPOXY ALKANE OR CYCLO-ALKANE AND POLYMERS THEREOF
Eugene L. Stogryn, Fords, and Perry A. Argabright and Ralph J. Leary, Cranford, N.J., assignors to Esso Research and Engineering Company, a corporation of Delaware
No Drawing. Filed Jan. 18, 1962, Ser. No. 168,015
Int. Cl. C08g 23/06; C07d 1/02
U.S. Cl. 260—2
13 Claims This invention relates to difluoramino epoxy alkane monomers, their polyether polymers, and synthesis of these materials for use in solid rocket propellants.

The difluoramino polyethers fall into the category of high-energy fluorine oxidizer binders. They are attractive for making high-energy castable grains. They can be crosslinked with difluoramino diisocyanate or other energetic monomers containing $NF_2$ or $NO_2$ groups and functional groups which react with hydroxyl groups of the polymers, e.g. diacid halides. They may also be modified by reaction with compounds containing energy groups and functional groups which react with terminal hydroxy groups of the polymers.

Surprisingly, discovery was made in the present invention of how to prepare the difluoramino epoxy alkane monomers and their polymers without loss of $NF_2$ groups; also, discovery was made that the resulting polymers can be suitably composited with finely-divided fuels and oxidizers needed for high-energy propellants, and then be cast into an elastomeric binder that exhibits case bonding properties.

The polyethers of interest in the present invention have the linear structure —O·R·O·R·O·R·O—, wherein the R groups in the recurring units represent alkyl, open chain and closed chain, or cycloalkyl radicals having about 5 to 8 carbon atoms, and preferably at least two $NF_2$ substituent groups attached to two of the carbon atoms in said radicals. The polymer molecules generally have terminal hydroxyl groups. In order to synthesize these polyethers, suitable monomers have to be prepared and, up until the present invention, difficulties were encountered in the preparation of the monomers.

Two methods were found to be suitable for preparing the desired $NF_2$-containing epoxy alkanes: (1) using an unsaturated epoxide or epoxy alkene for direct addition of $N_2F_4$ to the double bond with the carbons in the epoxy group separated from the double bond by at least one methylene group; and (2) the epoxidation of an $N_2F_4$ adduct of an unsaturated hydrocarbon. In this respect, suitable starting materials are bis-($NF_2$) adduct of 1,4-pentadiene or of 1,5-hexadiene, 3,4-epoxy vinyl cyclohexane, and 1,4-pentadiene monoxide.

Procedures for preparing the $NF_2$-containing epoxides or difluoramino epoxy alkanes and for polymerizing the epoxides are described more fully in the following examples.

EXAMPLE 1.—PREPARATION OF 4,5-BIS-(DIFLUORAMINO) PENTENE-1

Pentadiene-1,4 (4.9 g.) and 3.02 g. of $N_2F_4$ in a 5 liter glass reactor were heated for 5 hours at 110° C. The reactor was returned to room temperature (20° to 25° C.) and its contents were removed by vacuum distillation through a −76° C. and −196° C. trap. The −76° C. trap contained unreacted pentadiene-1,4 and 4,5-bis (difluoramino) pentene-1. Separation of starting material from product was accomplished by a second fractional distillation. In this manner, a 70% yield of 4,5-bis-(difluoramino) pentene-1, B.P. 124° to 125° C., was obtained.

Epoxidation of 4,5-bis-($NF_2$) pentene-1 was effected in good yields and high purity by using trifluoroperacetic acid, ($F_3CCO_3H$), in a buffered system. The use of solid sodium hydrogen phosphate, $Na_2HPO_4$, as buffer in refluxing $CH_2Cl_2$ gave a high yield (90+%) of 4,5-bis-($NF_2$) pentene-1 oxide. A water white viscous oil was obtained by bulb-to-bulb distillation at 45° to 50° C./0.005 mm. Hg abs. pressure. The distilled fraction gave the following elemental analysis:

Calc.: C=31.9%; N=14.97%; F=40.5%. Found: C=31.27%; N=15.57%; F=41.1%.

This product was obtained as described in the following example.

EXAMPLE 2.—PREPARATION OF 4,5-BIS-($NF_2$) PENTENE-1 OXIDE 4,5-bis-($NF_2$) pentene-1 oxide was prepared in the following manner. To a solution of 2.5 g. of 4,5-bis-(difluoramino) pentene-1, 9.31 g. of $Na_2HPO_4$ (or $Na_2CO_3$, 6.95 g.) in 14.5 ml. $CH_2Cl_2$ at reflux was added a premixed solution of 0.583 ml. (98%) $H_2O_2$, 5.5 g. ($CF_3CO)_2O$ and 3.72 ml. $CH_2Cl_2$ dropwise. The reaction mixture was then filtered and the filtrate stripped of unreacted olefin and $CH_2Cl_2$. The yield of the desired epoxide is greater than 90%. Elemental analyses, C, H, N, and F, infrared spectra, and nuclear magnetic resonance show the product to be the desired epoxide.

Polymerization of the $NF_2$-containing epoxides was found to be initiated by a number of acidic catalysts classed as Lewis acids, such as in the group consisting of $PF_5$, $PF_5$·tetrahydrofuran complex, $PF_5$·2-methyltetrahydrofuran complex, anhydrous $FeCl_3$, $BF_3$, $BF_3$·ether complex, $AlCl_3$, and others. Of these various catalysts, $PF_5$ and $PF_5$ complexes, and $BF_3$ were among the most effective catalysts, especially for use in polymerizing at the relatively low temperatures in the range of −76° to +150° C., and preferably in the range of −30° to +70° C.

Depending upon the activity of the catalyst and the reaction conditions, the polymerization of the epoxides can be carried out to form oily oligomers or high molecular weight solid resins. The amount of catalyst used is in the range of about 1 to 15 wt. percent with respect to the monomer.

EXAMPLE 3.—PREPARATION OF 4,5-BIS-(DIFLUORAMINO) PENTENE-1 OXIDE POLYMER

When 4,5-bis-($NF_2$) pentene-1 oxide, also termed 1,2-bis-($NF_2$) 4,5-epoxy pentane, was stirred with a catalytic amount of $PF_5$·tetrahydrofuran complex, polymerization began almost immediately as shown by an increase in the viscosity of the polymerization mixture. This expoxide was prepared as described in Example 2 and has the following formula:

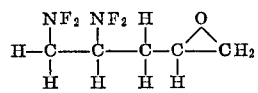

After standing overnight, an additional quantity of catalyst was added and the mixture was stirred for an additional 1.5 hours, after which time the mixture resisted stirring. After standing over a number of hours, the polymer was extracted with carbon tetrachloride and the fractions, both soluble and insoluble in the CCl₄ were analyzed as shown in the following table.

TABLE I

[Poly-4,5-bis-(difluoramino) pentene-1 oxide (PF₅·THF catalyst, ambient temperature)]

|  | Percent F | Percent N | Percent C | Mol wt.¹ |
|---|---|---|---|---|
| CCl₄ soluble | 44.5 | 13.13 | 29.70 | 597 |
| CCl₄ insoluble | 44.5 | 14.21 | 30.72 | 2,450 |
| Calculated | 40.5 | 14.9 | 31.9 | |

¹ Molecular weight determined ebullioscopically.

The recurring unit of the polymer thus has the composition $(C_5H_8ON_2F_4)_n$, the subscript $n$ indicating the number of monomeric units linked together in the form of the polyether which has the following type unit structure:

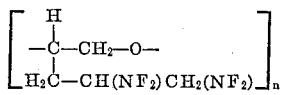

Polymerization of the NF₂-containing epoxide was accomplished at temperatures ranging up to 50° C. with other catalysts to obtain molecular weights in the range of 300 to 800. Anhydrous FeCl₃ was found effective at 50° C. Although in some polymerizations the polymeric oils were colored, usually there was no degradation of the NF₂ groups. Even after standing for several weeks at ambient temperature, the polymers gave infrared scans superimposable with freshly prepared polymer.

The polymers of the bis-(NF₂) pentene-1 oxide were reacted with 2,3-bis-(difluoramino) 1,4-butane diisocyanate to form an elastomeric polyurethane which was found to cling to the walls of the polymerization vessel, thus exhibiting the very desirable property of case bonding. For this reason, a propellant composition prepared with this type of elastomeric polyurethane binder can be casted into a rocket chamber for curing and bonding to the rocket case.

Instead of forming the unsaturated N₂F₄ adduct and subsequently epoxidizing it, it has been found that there are available epoxy compounds having suitable unsaturation for preparing the N₂F₄ adduct thereof. This is illustrated by the following preparation.

EXAMPLE 4.—PREPARATION OF N₂F₄ ADDUCT OF 3,4-EPOXY VINYL CYCLOHEXANE 3,4-epoxy vinyl cyclohexane, 4.4 mmoles, in 1 ml. of carbon tetrachloride was reacted with 9.0 mmoles of N₂F₄ in a 7 ml. steel finger bomb. The reaction was heated for 3 hours at 100° C. After removal of the gases from the cooled bomb, a pale yellow oil was obtained. Vacuum distillation of this oil yielded a water white oil which analyzed for the N₂F₄ adduct of 3,4-epoxy vinyl cyclohexane.

Calc.: F=33.3%; N=12.28%; C=42.1%. Found: F=32.2%; N=12.34%; C=42.72%.

The infrared analysis showed that the resulting N₂F₄ adduct had a structure consistent with the following:

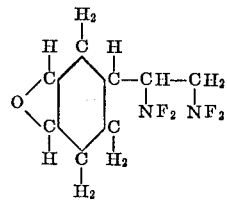

The work with the unsaturated compounds of the class set foth showed that the epoxide ring does not interfere with the normal addition of the N₂F₄ to the double bond where the double bond is not in conjugation with the epoxide ring.

As in the polymerization of the NF₂-containing alkyl oxides, the same kinds of catalysts were found effective for the polymerization of the epoxy vinyl cyclohexane-N₂F₄ adduct. The following example serves to illustrate the polymerization.

EXAMPLE 5.—POLYMERIZATION OF BIS-(NF₂) ETHYL 3,4-EPOXY CYCLOHEXANE

The N₂F₄ adduct, bis-(NF₂) ethyl 3,4-epoxy cyclohexane, prepared in accordance with Example 4, was reacted at ambient temperatures (20° to 25° C.) for 10 to 14 hours with a catalytic amount of PF₅·tetrahydrofuran complex. A number of runs were made with no stirring after initial mixing. At the end of the polymerization time when a solid polymerized mass was formed, this mass was dissolved in acetone and reprecipitated with methanol. The dried solid polymer gave the following elemental analysis: 47.79% C; 12.34% N; and 32.2% F. The theoretical calculated composition of the polymer $$(C_8H_{12}ON_2F_4)_n$$

is 42.1% C; 12.09% N; and 33.3% F. It was found that the NF₂ groups did not interfere with the polymerization and was not decomposed. The resulting polymer was determined to have a recurring unit structure which is represented as follows:

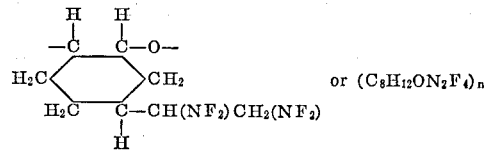

A number of catalysts were tried in various polymerization runs on the bis-(NF₂) ethyl 3,4-epoxy cyclohexane. Using PF₅·2-methyltetrahydrofuran as catalyst, with no stirring after initial mixing and at a temperature of 20° to 25° C., after 120 hours the polymer formed was a plastic of 1400 molecular weight. A similar high molecular weight polymer was formed using the same catalyst and polymerizing the monomer in a solution of CCl₄. BF₃·etherate used as a catalyst formed a polymer of similar high molecular weight at a polymerization temperature of 25° to 40° C.

By way of comparison, the polymerizing the bis-(NF₂) epoxy pentane under the same conditions and for the same length of time with catalytic amounts of PF₅·tetrahydrofuran, the polymers obtained had molecular weights in the range of 507 to 2450. These molecular weights were obtained by fractionating the gross polymer.

The elemental analyses and infrared spectra of the polymers obtained, as described, show that the NF₂-containing polyethers were formed without destruction of the difluoramino groups. These polyethers possess terminal hydroxyl groups that are useful for further polymerization and crosslinking with diisocyanates, phosgene, diacid halides, and other such reactants, to form polyurethanes, polycarbonates and polyesters, which are of higher molecular weight.

A large number of solid propellant compositions having an NF₂-containing polyether as binder have been determined to meet high Isp requirements of the order of 270 to 292 seconds using various oxidizers and fuels. In some of these compositions, hexanitroethane, $C_2(NO_2)_6$, or hydrazine nitroformate has been selected as oxygen oxidizer. Powdered metals, such as boron, was used as additional fuel in some. A difluoramino compound having at least one NF₂/carbon, e.g. tetrakis-(NF₂-tetrahydrofuran, $C_4H_4(NF_2)_4O$, was used as a fluorine oxidizer together with an oxygen oxidizer in some. Examples of such propellant compositions are the following:

Propellant of 292 Isp

Binder=polymerized 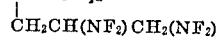

| Components: | Wt. percent |
|---|---|
| $C_4H_4(NF_2)_4O$ | 60 |
| $C_2(NO_2)_6$ | 27 |
| B powder | 3 |
| $[C_5H_8(NF_2)O]_n$ | 10 |

Propellant of 276 Isp

| Components: | Wt. percent |
|---|---|
| $C_4H_4(NF_2)_4O$ | 20 |
| $N_2H_5C(NO_2)_3$ | 60 |
| $[C_5H_8(NF_2)_2O]_n$ | 20 |

What is claimed is:

1. A difluoramino epoxy alkane containing 5 to 8 carbon atoms, an $NF_2$ substituent group being attached to each of 2 of the carbon atoms of an alkyl radical, and said carbon atoms with attached $NF_2$ groups being separated by a methylene group from an epoxy group.

2. The bis-(difluoramino) epoxy alkane, 1,2-bis-($NF_2$) 4,5-epoxy pentane, having the formula:

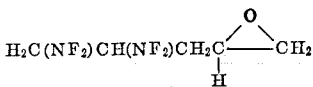

3. The bis-(difluoramino) epoxide, bis-($NF_2$) ethyl-3,4-epoxy cyclohexane having the formula:

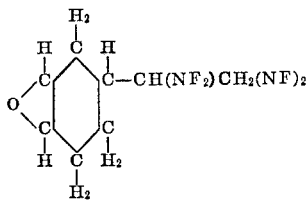

4. A polyether of a difluoramino epoxy alkane containing 5 to 8 carbon atoms, an $NF_2$ substituent group being attached to each of 2 of the carbon atoms of an alkyl group, and said carbon atoms with attached $NF_2$ groups being separated from an epoxy group by a methylene group.

5. A polymer of 1,2-bis-($NF_2$) 4,5-epoxy pentane, said polymer containing the recurring unit:

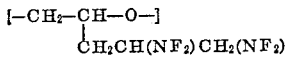

6. A polymer of bis-($NF_2$) ethyl-3,4-epoxy cyclohexane, said polymer containing the recurring unit:

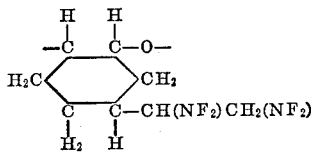

7. Method of preparing a polyether containing $NF_2$ groups which comprises forming a $C_5$ to $C_8$ bis-difluoramino (epoxy alkane which has its epoxy group separated from $CNF_2$ groups by a methylene group, polymerizing said bis-(difluoramino) epoxy alkane at a temperature in the range of $-76°$ to $150°$ C. with a catalytic amount of a Lewis acid polymerization catalyst containing a halide selected from the group consisting of $PF_5$, $BF_3$, $FeCl_3$, and $AlCl_3$ for a period sufficient to form a viscous oily to solid polyether, and recovering the resulting polyether containing $NF_2$ groups added to the double bond in each monomer unit.

8. The method of claim 7 in which $PF_5$ is in the Lewis acid catalyst.

9. The method of claim 7 in which $BF_3$ is in the Lewis acid catalyst.

10. The method of claim 7 in which $FeCl_3$ is in the Lewis acid catalyst.

11. Method of preparing 4,5-bis-($NF_2$) pentene-1 oxide which comprises reacting 4,5-bis-($NF_2$) pentene-1 with buffered trifluoroperacetic acid in an inert diluent and recovering resulting epoxidized 4,5-bis-($NF_2$) pentene-1 oxide.

12. Method of preparing bis-($NF_2$) ethyl-3,4-epoxy cyclohexane which comprises reacting 3,4-epoxy vinyl cyclohexane with $N_2F_4$ in at least stoichiometric proportion to add an $NF_2$ group to each of the carbon atoms in the vinyl group at about $100°$ C., and recovering a resulting product having the composition of bis-($NF_2$) ethyl-3,4-epoxy cyclohexane.

13. A difluoramino organic oxide containing 5 to 8 carbon atoms in its monomeric unit with an $NF_2$ substituent group attached to each of 2 carbon atoms in an alkyl radical of the monomeric unit, said carbon atoms with attached $NF_2$ groups being separated by a methylene group from carbon linked to oxygen in the unit, said organic compound being selected from the class consisting of bis-(difluoramino) epoxy alkanes having 5 to 8 carbon atoms, bis-($NF_2$) ethyl-3,4-epoxy cyclohexane, and polyethers of said bis-(difluoramino) epoxy alkanes and of said bis-($NF_2$) ethyl-3,4-epoxy cyclohexane.

References Cited

Farber: Astronautics, August 1960, pp. 34, 40 and 42.
Hoffman et al.: Chem. Reviews, vol. 62, pp. 12–18 (1962).

LELAND A. SEBASTIAN, *Primary Examiner.*

U.S. Cl. X.R.

149—19, 22, 36, 89, 109; 260—348, 583, 584